(12) United States Patent
Motiee

(10) Patent No.: US 10,895,457 B2
(45) Date of Patent: Jan. 19, 2021

(54) DIFFERENTIAL Z-AXIS RESONANT ACCELEROMETRY

(71) Applicant: Analog Devices, Inc., Norwood, MA (US)

(72) Inventor: Mehrnaz Motiee, Boston, MA (US)

(73) Assignee: Analog Devices, Inc., Norwood, MA (US)

( * ) Notice: Subject to any disclaimer, the term of this patent is extended or adjusted under 35 U.S.C. 154(b) by 273 days.

(21) Appl. No.: 15/915,870

(22) Filed: Mar. 8, 2018

(65) Prior Publication Data

US 2019/0277634 A1 Sep. 12, 2019

(51) Int. Cl.
G01C 19/5712 (2012.01)

(52) U.S. Cl.
CPC .................. G01C 19/5712 (2013.01)

(58) Field of Classification Search
CPC .................................. G01C 19/5712
USPC ....................................... 73/514.15
See application file for complete search history.

(56) References Cited

U.S. PATENT DOCUMENTS

| | | |
|---|---|---|
| 3,465,597 A | 9/1969 | Riordan et al. |
| 4,901,570 A | 2/1990 | Chang et al. |
| 5,113,698 A | 5/1992 | Grlj et al. |
| 5,165,289 A | 11/1992 | Tilmans |
| 5,239,870 A | 8/1993 | Kaneko |
| 5,313,023 A | 5/1994 | Johnson |
| 5,379,639 A | 1/1995 | Hulsing, II et al. |
| 5,456,110 A | 10/1995 | Hulsing, II |
| 5,461,918 A | 10/1995 | Mozurkewich |
| 5,715,874 A | 2/1998 | Reynolds et al. |
| 6,032,531 A | 3/2000 | Roszhart |
| 6,067,858 A | 5/2000 | Clark et al. |
| 6,311,556 B1 | 11/2001 | Lefort et al. |
| 7,915,965 B2 | 3/2011 | Hardy et al. |
| 8,136,401 B2 | 3/2012 | Hentz et al. |
| 8,375,788 B2 | 2/2013 | Robert |

(Continued)

FOREIGN PATENT DOCUMENTS

EP    2 713 169 A1    4/2014

OTHER PUBLICATIONS

Lee et al., A Vacuum Packaged Differential Rsonant Acceelerometer Using Gap Sensitive Electrostatic Stiffness Changing Effect. IEEE. 2000;pp. 352-357.

(Continued)

Primary Examiner — Walter L Lindsay, Jr.
Assistant Examiner — Philipmarcus T Fadul
(74) Attorney, Agent, or Firm — Wolf, Greenfield & Sacks, P.C.

(57) ABSTRACT

A MEMS resonant accelerometer includes two proof masses configured to resonate when driven with periodic signals. Each proof mass includes a resonator structure that vibrates relative to the proof mass and a dummy structure that does not resonate. When driven by a periodic drive signal, the resonator structures of the two proof masses may be used to determine the magnitude of acceleration in the direction perpendicular to the planes of the proof masses by sensing the frequency at which the resonators vibrate. For example, a differential oscillation frequency may be computed from the two sensed frequencies. The dummy structures are used to make the mass distribution of the two proof masses similar.

20 Claims, 7 Drawing Sheets

(56) References Cited

U.S. PATENT DOCUMENTS

| | | | |
|---|---|---|---|
| 8,418,556 B2 | 4/2013 | Chen et al. | |
| 8,516,889 B2 | 8/2013 | Simoni et al. | |
| 8,528,404 B2 | 9/2013 | Ayazi | |
| 8,671,756 B2 | 3/2014 | Comi et al. | |
| 8,783,107 B2 | 7/2014 | Robert et al. | |
| 8,890,391 B2 | 11/2014 | Koyama et al. | |
| 9,140,550 B2 | 9/2015 | Deimerly et al. | |
| 9,190,937 B2 | 11/2015 | Lin et al. | |
| 9,377,482 B2 | 6/2016 | Comi et al. | |
| 2005/0109109 A1 | 5/2005 | Eskridge et al. | |
| 2005/0199063 A1* | 9/2005 | Higuchi | G01C 19/5762 73/514.32 |
| 2006/0005603 A1* | 1/2006 | Chau | G01P 15/125 73/1.38 |
| 2008/0158370 A1 | 7/2008 | Pasolini et al. | |
| 2009/0255339 A1 | 10/2009 | McNeil et al. | |
| 2012/0132003 A1 | 5/2012 | Comi et al. | |
| 2012/0186347 A1 | 7/2012 | McNeil | |
| 2013/0019682 A1 | 1/2013 | Hsu | |
| 2014/0090469 A1* | 4/2014 | Comi | G01P 15/097 73/504.12 |
| 2014/0090471 A1 | 4/2014 | Hsu | |
| 2014/0174183 A1 | 6/2014 | Comi et al. | |
| 2014/0208823 A1 | 7/2014 | Trusov et al. | |
| 2015/0330784 A1* | 11/2015 | Bertini | G01C 19/574 73/504.12 |
| 2019/0049482 A1 | 2/2019 | Motiee | |
| 2020/0166537 A1 | 5/2020 | Zou et al. | |

OTHER PUBLICATIONS

Trusov et al., Silicon Accelerometer with Differential Frequency Modulation and Continuous Self-Calibration. MEMS. 2013;pp. 29-32.

International Search Report and Written Opinion dated Jun. 11, 2019 in connection with International Application No. PCT/US2019/021256.

[No Author Listed], Phase-locked loop. Wikipedia. 2017; 15 pages. Retrieved from the Internet:; URL: https://en.wikipedia.org/wiki/Phase-locked_loop; Date: Aug. 4, 2017.

International Preliminary Report on Patentability dated Sep. 17, 2020 in connection with International Application No. PCT/US2019/021256.

* cited by examiner

DIFFERENTIAL Z-AXIS RESONANT ACCELEROMETRY

FIELD OF THE DISCLOSURE

The present application relates to microelectromechanical systems (MEMS) resonant accelerometers.

BACKGROUND

Some MEMS accelerometers include a resonator structure coupled to a proof mass. A driving electrode drives the resonator structure to vibrate out of the plane of the proof mass. The proof mass is configured to move in response to acceleration in the direction perpendicular to the plane of the proof mass. The oscillation frequency at which the resonator vibrates shifts based on the acceleration experienced by the MEMS accelerometer due to a shift in the distance between the resonator structure and the driving electrode.

Some MEMS accelerometers include two resonator structures coupled to the proof mass. Each resonator structure is separately driven and experiences a different shift in oscillation frequency because each resonator structure will be a different distance away from a driving electrode based on its location with respect to the proof mass. The difference in the oscillation frequencies of the two resonator structures may be used to determine the acceleration experienced by the MEMS accelerometer.

Some MEMS accelerometers use capacitive sensors to detect the amplitude of the motion of the resonators.

SUMMARY OF THE DISCLOSURE

In some embodiments, a microelectromechanical system (MEMS) resonant accelerometer includes two proof masses configured to resonate when driven with periodic signals. Each proof mass includes a resonator structure that vibrates relative to the proof mass and a dummy structure that does not resonate. When driven by a periodic drive signal, the resonator structures of the two proof masses may be used to determine the magnitude of acceleration in the direction perpendicular to the planes of the proof masses by sensing the frequency at which the resonators vibrate. For example, a differential oscillation frequency may be computed from the two sensed frequencies. The dummy structures are used to make the mass distribution of the two proof masses similar.

According to one aspect of the present application, a MEMS accelerometer is described. The MEMS resonant accelerometer may include a first teeter-totter structure and a second teeter-totter structure. The first teeter totter structure may include a first proof mass coupled to a substrate through a first anchor, the first proof mass having first and second mass portions having different masses and disposed at opposite sides of the first proof mass with respect to the first anchor; a first resonator structure pivotally attached to the first proof mass and configured to vibrate relative to the first proof mass; and a first dummy structure fixedly attached to the first proof mass. The second teeter-totter structure may include a second proof mass coupled to the substrate through a second anchor, the second proof mass having third and fourth mass portions having different masses and disposed at opposite sides of the second proof mass with respect to the second anchor; a second resonator structure pivotally attached to the second proof mass and configured to vibrate relative to the first proof mass; and a second dummy structure fixedly attached to the second proof mass.

According to another aspect of the present application, a MEMS resonant device is provided. The MEMS device may include an accelerometer. The accelerometer may include a first teeter-totter structure and a second teeter-totter structure. The first teeter totter structure may include a first proof mass coupled to a substrate through a first anchor, the first proof mass having first and second mass portions having different masses and disposed at opposite sides of the first proof mass with respect to the first anchor; a first resonator structure pivotally attached to the first proof mass and configured to vibrate relative to the first proof mass; and a first dummy structure fixedly attached to the first proof mass. The second teeter-totter structure may include a second proof mass coupled to the substrate through a second anchor, the second proof mass having third and fourth mass portions having different masses and disposed at opposite sides of the second proof mass with respect to the second anchor; a second resonator structure pivotally attached to the second proof mass and configured to vibrate relative to the first proof mass; and a second dummy structure fixedly attached to the second proof mass.

According to yet another aspect of the present application, a method for sensing accelerations using a MEMS accelerometer is provided. The method may causing a first resonator structure to vibrate out-of-plane by vibrating about a first axis, wherein the first resonator structure is coupled to a first proof mass that includes a first dummy structure that is the same mass as the first resonator structure; causing a second resonator structure to vibrate out-of-plane by vibrating about a second axis, wherein the second resonator structure is coupled to a second proof mass that includes a second dummy structure that is the same mass as the second resonator structure; sensing a first oscillation frequency of the first resonator structure and a second oscillation frequency of the second resonator structure; and computing a differential oscillation frequency from the first and second oscillation frequencies.

BRIEF DESCRIPTION OF THE DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

DETAILED DESCRIPTION

Figure 1A:
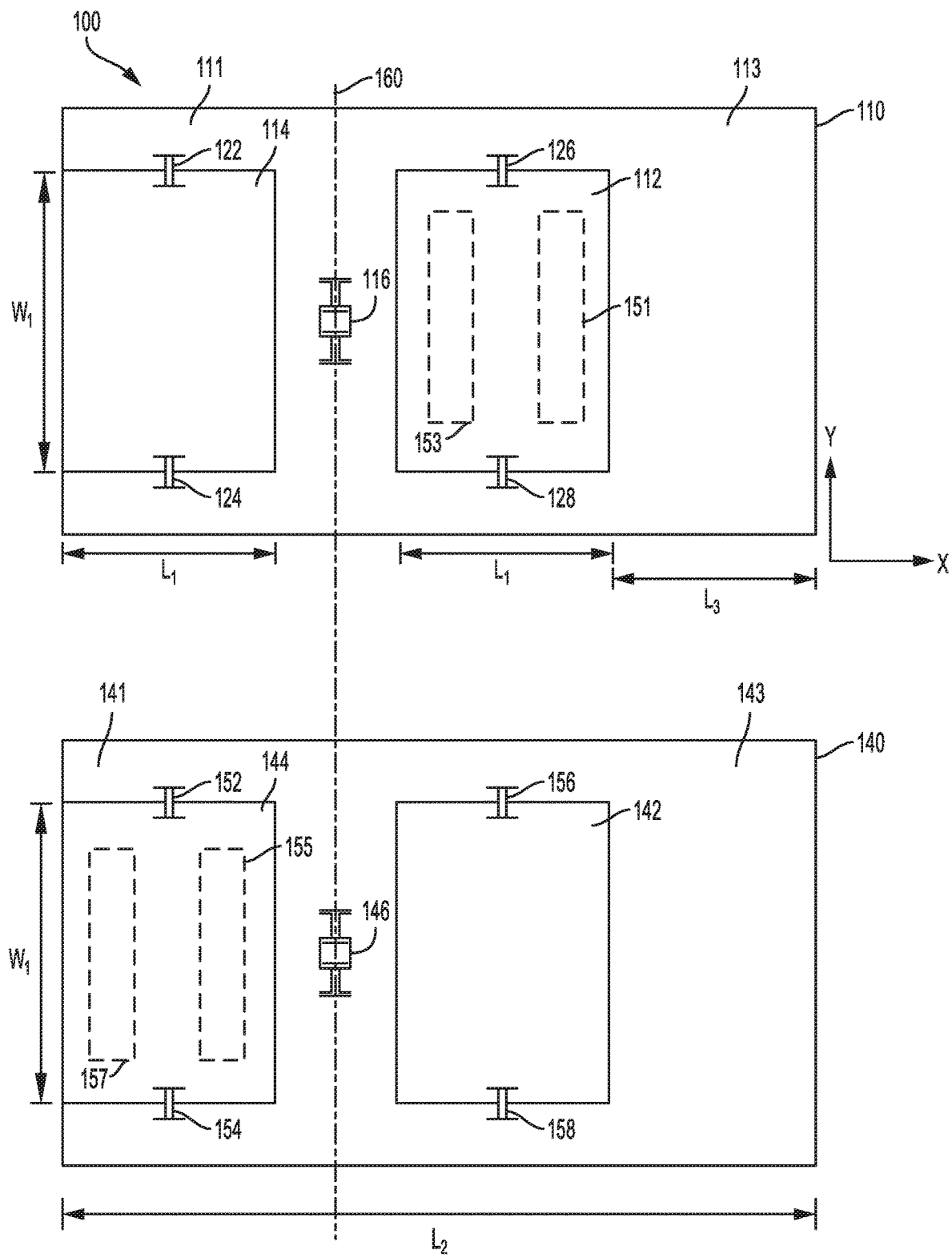
FIG. 1A is a schematic top view illustrating a MEMS accelerometer, according to some non-limiting embodiments.

The inventor has recognized and appreciated that the sensitivity of MEMS resonant accelerometers to out-of-plane accelerations may be improved by using the difference between the vibration frequencies of two resonator structures coupled to a proof mass (referred to as a differential oscillation frequency). There are at least two advantages to using the differential oscillation frequency as compared to simply using a frequency shift of a single resonator structure. First, the magnitude of the differential oscillation frequency is twice that of the frequency shift of a single resonator structure. Second, using a differential oscillation frequency reduces inaccurate readings caused by shifts in the oscillation frequency of an individual resonator structure due to environmental causes. For example, the oscillation frequency of a resonator structure may shift due to a change in the temperature of the environment in which the MEMS accelerometer is located. In the case where a differential oscillation frequency is used to determine the acceleration, such environmental shifts in oscillation frequency effect each of the resonator structures in the same way such that when the difference in oscillation frequency is calculated, the environmental shift cancels out.

The inventors have further recognized and appreciated that using the differential oscillation frequency of two resonator structures coupled to a single proof mass may result in an inaccurate determinations of the acceleration experienced by the MEMS accelerometer due to the two resonator structures being mechanically coupled by the shared proof mass, resulting in mechanical energy being transferred between the two resonator structures. This mechanical coupling may result in, for example, locking and/or dead band in the response of a sensor. The inventors have additionally recognized and appreciated that the mechanical coupling of the two resonator structures may be reduced and practically eliminated by isolating the two resonator structures from one another.

Thus, some embodiments of the present application are directed to a MEMS resonant accelerometer in which two proof masses are used, each proof mass including only one resonator structure that vibrates relative to the proof mass. By using two separate proof masses, each coupled to only a single resonator structure, the mechanical coupling between the two resonator structures is effectively eliminated. At the same time, a differential oscillation frequency can still be used to calculate the acceleration experienced by the MEMS accelerometer by calculating the difference between a first resonator structure coupled to a first proof mass and a second resonators structures coupled to a second proof mass that is different from the first proof mass. For the differential oscillation frequency to be useful in determining the acceleration, the position of the resonator structure within one proof mass may be on the opposite side of an anchor axis than the position of the resonator structure within the other proof mass.

The inventors have further recognized and appreciated that to accurately determine an acceleration with a MEMS accelerometer that includes two proof masses, each with a single resonator structure, the combination of proof mass and resonator structure should be as similar as possible. Accordingly, a dummy structure is coupled to each proof mass to make the two proof masses similar in structure. Each dummy structure is located at a position within the respective proof mass that corresponds to the position of the resonator structure of the other proof mass. The dummy structures have substantially the same mass and shape as the resonator structures.

Some embodiments include a drive electrode for each proof mass, to drive the resonator structure of the corresponding proof mass at a particular frequency. The drive electrode is located on an underlying substrate in proximity to the associated resonator structure. No drive electrode is located in proximity to the dummy structure.

Some embodiments include a sense electrode for each proof mass, to sense a distance between the sense electrode and a portion of the resonator structure of the corresponding proof mass. The sense electrode is located on the underlying substrate in proximity to the associated resonator structure. No sense electrode is located in proximity to the dummy structure.

Such a single mass resonates when driven with a driving signal, and is allowed to move in response to accelerations. The frequency at which the single mass oscillates in response to acceleration may be detected using suitable detectors, thus providing a measure of the magnitude of the acceleration. Furthermore, some embodiments are directed to MEMS resonant accelerometers configured to operate differentially, in which a pair of masses is provided, with each of the masses being used as a resonator and a proof mass.

The aspects and embodiments described above, as well as additional aspects and embodiments, are described further below. These aspects and/or embodiments may be used individually, all together, or in any combination of two or more, as the application is not limited in this respect.

FIG. 1A is a top view schematic diagram illustrating a MEMS accelerometer 100, according to some non-limiting embodiments. The MEMS accelerometer 100 includes proof masses 110 and 140, resonator structures 112 and 144, and dummy structures 114 and 142. The proof masses 110 and 140 are coupled to an underlying substrate 101 (see FIG. 1C) via anchors 116 and 146, respectively. The first resonator structure 112 is coupled to the proof mass 110 via tethers 126 and 128, and the second resonator structure 144 is coupled to the proof mass 140 via tethers 152 and 154. The first dummy structure 114 is coupled to the proof mass 110 via tethers 122 and 124, and the second dummy structure 142 is coupled to the proof mass 140 via tethers 156 and 158.

Figure 1B:
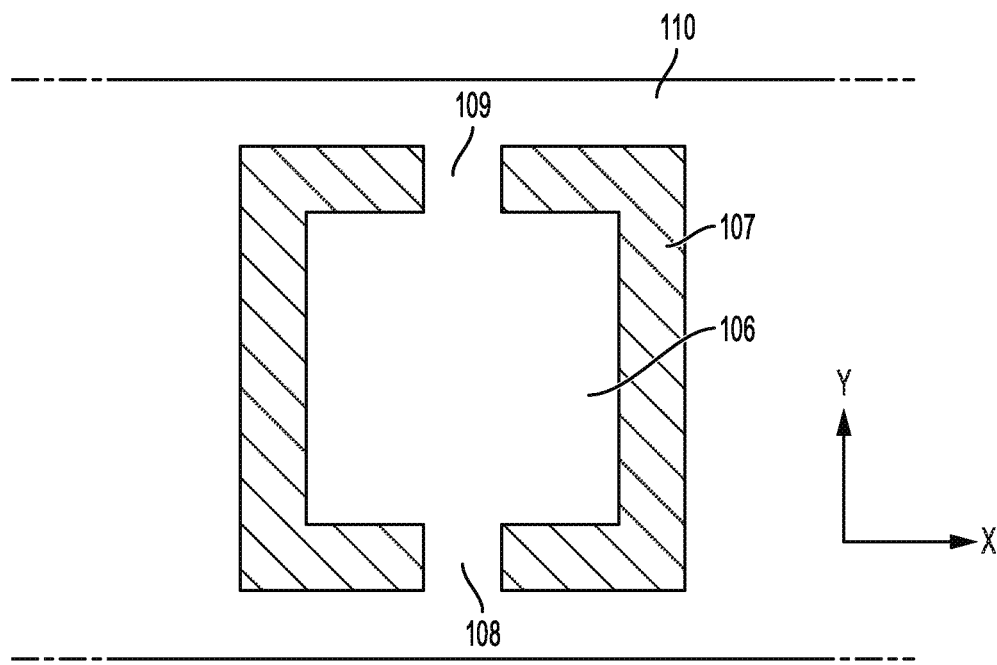
FIG. 1B is a schematic top view illustrating tethers that may be used with a MEMS accelerometer of FIG. 1A, according to some non-limiting embodiments.

The proof masses 110 and 140 may be made of a conductor and/or semiconductor material, such as single-crystal silicon or polycrystalline silicon. In some embodiments, proof masses 110 and 140 are connected to the respective anchors 116 and 146 via a plurality of tethers. One such configuration is illustrated in FIG. 1B, which is a schematic top view illustrating tethers that may be used with the MEMS accelerometer 100, according to some non-limiting embodiments. As illustrated, tethers 108 and 109 may be formed by removing (for example, via etching) portions 107 from the first proof mass 110. Portions 107 may be removed to form an anchored proof mass portion 106 and tethers 130 and 131. The anchored proof mass portion 106 may be connected to anchor 116 (not shown in FIG. 1B), and may be connected to the body of the first proof mass 110 via tethers 108 and 109. Tethers 108 and 109 may be configured to torque in the xz-plane in response to accelerations parallel to the z-axis, thereby allowing for rotations of the first proof mass 110 about the first anchor 116. In this sense, the tethers 108 and 109 may be torsional beams. In the example illustrated in FIG. 1B, the tethers are configured to torque and they are separated along a direction parallel to the y-axis. The tethers 108 and 109 are substantially aligned to form an anchor axis about which the first proof mass 110 may rotate. The various aspects of the tethers 108 and 109 and anchored proof mass portion 106 described herein are not limited to any specific type or number of tethers. Though not illustrated, the second proof mass 140 may be connected to anchor 146 in a similar arrangement to that shown in FIG. 1B. Additionally, while the tethers 108 and 109 are illustrated as simple rectangular connections between the first proof mass 110 and the anchored proof mass portion 106, more complicated tether structures may be used. For example, the tethers 108 and 109 may have a serpentine shape.

Referring back to FIG. 1A, the proof masses 110 and 140 are elongated in a direction parallel to the x-axis such that the proof masses 110 and 140 are rectangular. Embodiments are not limited to any particular size or shape, but, in some embodiments, the size and the shape of the first proof mass 110 is the same as the size, shape, and mass of the second proof mass 140. In some embodiments, the first proof mass 110 is separated from the second proof mass 140 in a direction parallel to the y-axis. In some embodiments, the first resonator structure 112 and the first dummy structure 114 are arranged symmetrically about the first anchor 116 of the first proof mass 110 such that the distance between the first anchor 116 and the first resonator structure 112 is equal to the distance between the first anchor 116 and the first dummy structure 114. Similarly, in some embodiments, the second resonator structure 144 and the first dummy structure 142 are arranged symmetrically about the second anchor 146 of the second proof mass 140 such that the distance between the second anchor 146 and the second resonator structure 144 is equal to the distance between the second anchor 146 and the second dummy structure 142. The first anchor 116 and the second anchor 146 are substantially aligned along the x-direction. Thus, an imaginary line 160 in the x-y plane that connects the position of the first anchor 116 to the position of the second anchor 146 can be used to define two sides of the proof masses 110 and 140. A first mass portion 111 of the proof mass 110 is on a first side of the line 160 and a second mass portion 113 of the proof mass 110 is on a second side of the line 160. Similarly, a third mass portion 141 of the proof mass 140 is on a first side of the line 160 and a fourth mass portion 143 of the proof mass 140 is on a second side of the line 160. The imaginary line 160 may be considered an anchor axis, about which the proof masses 110 and 140 may rotate. Sharing the same rotation axis may be desirable as undesired signals, generated for example due to stress in the substrate, may be equally sensed by the two proof masses and therefore may be rejected as common modes. Of course, embodiments are not limited in this respect as the anchors 116 and 146 may be partially offset from one another (e.g., by less than 100 nm, less than 250 nm, less than 500 nm, less than 1 µm, less than 1 µm, less than 5 µm, or less than 10 µm) along the x-axis.

While the respective dummy structures and resonator structures are arranged symmetrically about their respective anchors, the anchors 116 and 146 are not arranged to be positioned under the center of mass of the proof masses 110 and 140. For example, the first anchor 116 is positioned towards a first side, in the x-direction, of the first proof mass 110 such that a first mass portion 111 has less mass than a second mass portion 113. The first mass portion 111 and the second mass portion 113 are disposed at opposite sides of the first proof mass 110 with respect to the first anchor 116. The second mass portion 113 is longer by a length $L_3$ in the x-direction than the length of the first mass portion 111. The asymmetric arrangement of the first proof mass 110 relative to the first anchor 116 results in the first proof mass 110 rotating in the x-z plane when the first proof mass 110 experiences an acceleration in a direction parallel to the z-axis.

The various aspects of the geometry of the first proof mass 110 described herein apply also to the second proof mass 140 such that the second proof mass 140 is also asymmetrically positioned above the second anchor 146. For example, the second anchor 146 is positioned towards a first side, in the x-direction, of the second proof mass 140 such that a third mass portion 141 has less mass than a fourth mass portion 143. The third mass portion 141 and the fourth mass portion 143 are disposed at opposite sides of the second proof mass 140 with respect to the second anchor 146. The fourth mass portion 143 is longer by a length $L_3$ in the x-direction than the length of the third mass portion 141. The asymmetric arrangement of the second proof mass 140 relative to the second anchor 146 results in the second proof mass 140 rotating in the x-z plane when the second proof mass 140 experiences an acceleration in a direction parallel to the z-axis.

The torquing and rotation of the proof masses 110 and 140 described above cause the structures to operate as teeter totters. That is, when one end of a proof mass moves in one direction out-of-plane (i.e., out of the x-y plane), the opposite end of the proof mass moves in the opposite direction by pivoting about the anchor, which acts as a fulcrum. In some embodiments, a first teeter totter structure includes at least the first proof mass 110, the first anchor 116, the first resonator structure 112 and the first dummy structure 114, and a second teeter totter structure includes at least the second proof mass 140, the second anchor 146, second resonator structure 144, and the second dummy structure 142.

In some embodiments, the resonator structures 112 and 144 and the dummy structures 114 and 142 are formed by removing a portion of the proof mass material such that the resonator structures 112 and 144 and the dummy structures 114 and 142 are partially disconnected from and at least partially surrounded by one of the respective proof masses 110 or 140 and are substantially position in a plane defined by the respective proof masses 110 or 140. A portion of the proof mass material may be left to form the tethers 122, 124, 126, 128, 152, 154, 156, and 158. These tethers may be similar to tethers 108 and 109 shown in FIG. 1B. The tethers 122, 124, 126, 128, 152, 154, 156, and 158 are all oriented in a direction parallel to the y-axis—the same direction as the tethers 108 and 109—and couple the resonator structures and the dummy structures to the respective proof mass. For the resonator structures 112 and 144, the tethers 126, 128 and 152, 154, respectively, may be the only physical connection to the respective proof masses 110 and 140. In some embodiments tethers 126 and 128 are positioned directly opposite one another, separated in the y-direction but at the same position in the x- and z-direction such that the tethers 126 and 128 form a first axis about which the first resonator structure 112 may vibrate in a rotational manner when driven by a driving signal. In this way, the first resonator structure 112 is pivotally connected to the first proof mass 110. Similarly, tethers 152 and 154 are positioned directly opposite one another, separated in the y-direction but at the same position in the x- and z-direction such that the tethers 152 and 154 form a second axis about which the second resonator structure 144 may vibrate in a rotational manner when driven by a driving signal. In this way, the second resonator structure 144 is pivotally connected to the second proof mass 140. In some embodiments, the dummy structures 114 and 142 are connected to their respective proof masses 110 or 140 by additional tethers to prevent the dummy structures 114 and 142 from vibrating out of the plane of the proof mass.

In some embodiments, the resonator structures 112 and 144 and the dummy structures 114 and 142 have the same shape, mass, and dimensions. For example, the resonator structures 112 and 144 and the dummy structures 114 and 142 have a length $L_1$ in the x-direction, a width $W_1$ in the y direction, and a depth $D_1$ in the z-direction. The depth $D_1$ is the same as the depth of the proof masses 110 and 140 in the z-direction. In some embodiments, the length $L_1$ is greater than the distance from the resonator structures 112 and 144 and the dummy structures 114 and 142 to their respective anchors 116 and 146. The total length $L_2$ in the x-direction of the proof masses 110 and 140 is greater than $2L_1+L_3$.

In some embodiments, the first resonator structure 112 is not aligned with the second resonator structure 144 in the x-direction or the y-direction. For example, the first resonator structure 112 is disposed on the second side of the line 160, surrounded by the second mass portion 113 of the first proof mass 110 and the second resonator structure 144 is disposed on the first side of the line 160, surrounded by the third mass portion 141 of the second proof mass 140.

Figure 1C:
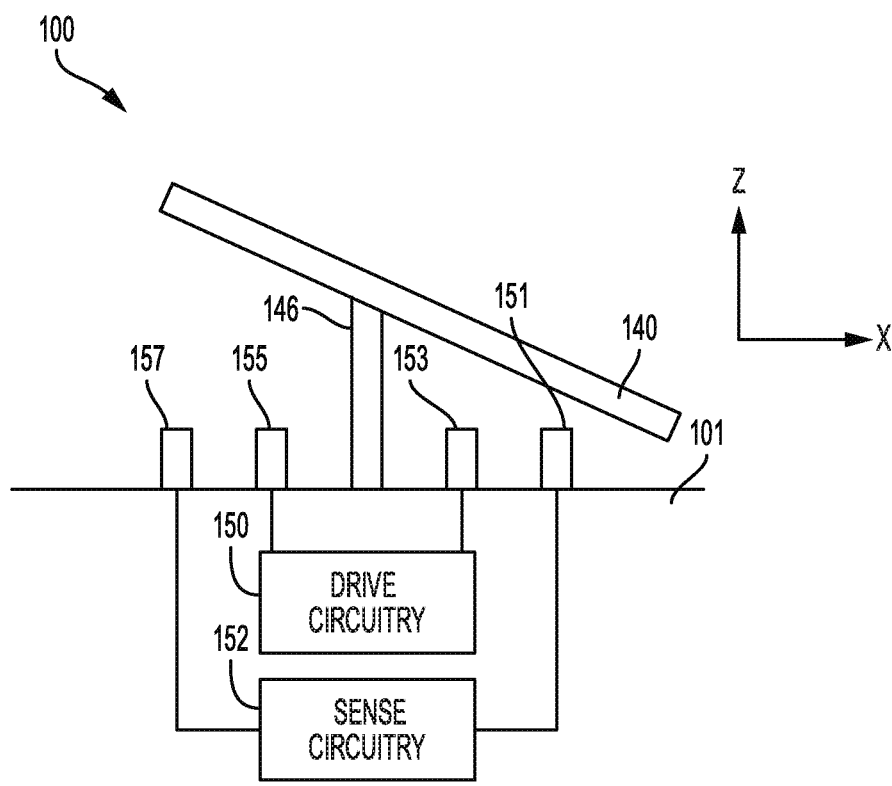
FIG. 1C is a side view of the MEMS accelerometer of FIG. 1A, according to some non-limiting embodiments.

Sense electrodes 151 and 157, and drive electrodes 153 and 155 are shown in dashed lines in FIG. 1A to indicate that they are disposed on a different xy-plane than proof masses 110 and 140. As shown in FIG. 1C, which is a side view of the MEMS accelerometer 100, the sense electrodes 151 and 157, and drive electrodes 153 and 155 are disposed on a substrate 101 that underlies the proof masses 110 and 140 in the z-direction. In some embodiments, the sense electrodes 151 and 157 are positioned nearer to the anchors 116 and 146, respectively, than the drive electrodes 153 and 155. The drive electrodes 153 and 155, which are in proximity to the resonator structures 112 and 144, respectively, may form a pair of drive capacitors with resonator structures 112 and 144, respectively. As illustrated in FIG. 1C, drive electrodes 153 and 155 may be coupled to drive circuitry 150, which may be disposed on the same substrate as the MEMS accelerometer 100, or a separate substrate. Drive circuitry 150 may be configured to excite the drive capacitors with alternating current (AC) signals (e.g., periodic signals), thereby causing the resonator structures 112 and 144 to pivot about the first axis and second axis, respectively, and as a result, to vibrate (via electrostatic attraction/repulsion) out-of-plane. The dummy structures 114 and 142 are not associated with sense electrodes or a drive electrodes because no measurement of the dummy structures 114 and 142 is needed. Thus, there are no sense electrodes or drive electrodes in proximity to the dummy structures 114 and 142.

The sense electrodes 151 and 157, which are in proximity to the resonator structures 112 and 144, respectively, may form a pair of sense capacitors with the resonator structures 112 and 144, respectively. When the resonator structures 112 and 144 move out-of-plane, the sense capacitors experience a variation in capacitance, due to a change in the separation between the resonator structures and the sense electrodes. As such, the sense capacitors may detect motion of the resonator structures 112 and 144 (whether this motion is caused by accelerations experienced by the resonator structures, by drive signals, or by other reasons). In some embodiments, sense circuitry 152, which is coupled to the sense electrodes 151 and 157, may be configured to detect the frequenc(ies) with which resonator structures 112 and 144 vibrate, based on the signals obtained from the sense capacitors.

Figure 1D:
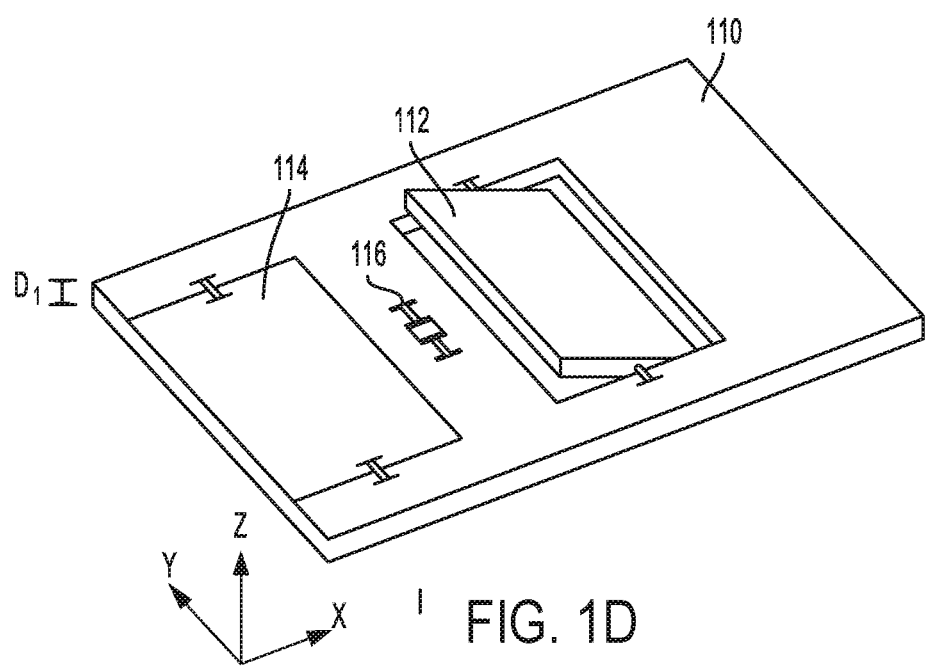
FIG. 1D is a perspective view of a first proof mass of the MEMS accelerometer of FIG. 1A, according to some non-limiting embodiments.

FIG. 1D is a perspective view of a first proof mass 110 of the MEMS accelerometer 100, according to some non-limiting embodiments. The first resonator structure 112 is shown vibrating out-of-plane. The first dummy structure 114 does not vibrate out of plane because of additional tethers that keep the first dummy structure 114 stationary.

Figure 1E:
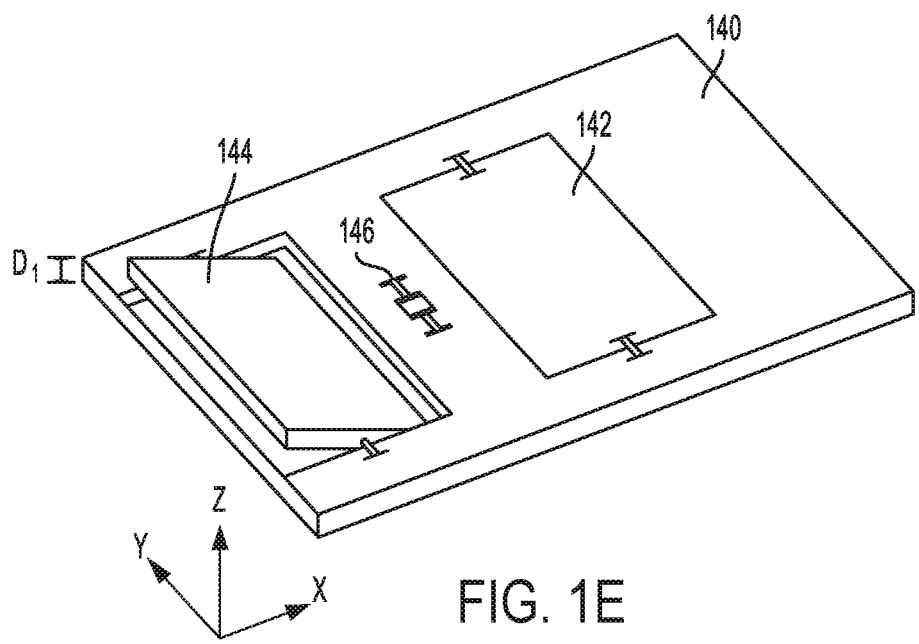
FIG. 1E is a perspective view of a second proof mass of the MEMS accelerometer of FIG. 1A, according to some non-limiting embodiments.

FIG. 1E is a perspective view of a second proof mass of the MEMS accelerometer 100, according to some non-limiting embodiments. The second resonator structure 144 is shown vibrating out-of-plane. The second dummy structure 142 does not vibrate out of plane because of additional tethers that keep the first dummy structure 114 stationary.

Figure 2A:
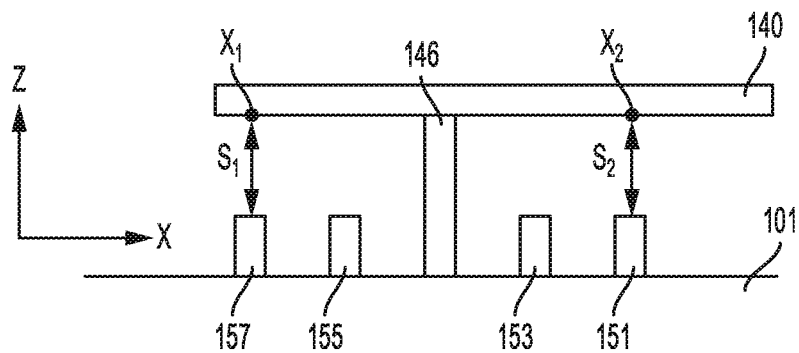
FIG. 2A is a side view of the MEMS accelerometer of FIG. 1A with no acceleration acting on the MEMS accelerometer, according to some non-limiting embodiments.
Figure 2B:
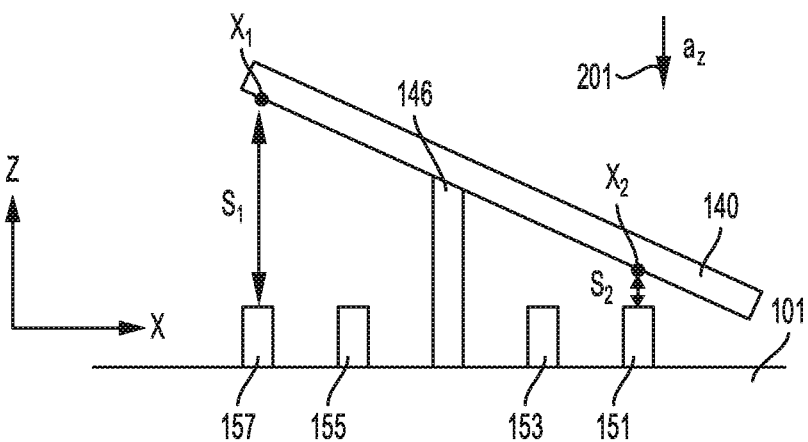
FIG. 2B is a side view of the MEMS accelerometer of FIG. 1A with an acceleration acting on the MEMS accelerometer, according to some non-limiting embodiments.
Figure 2C:
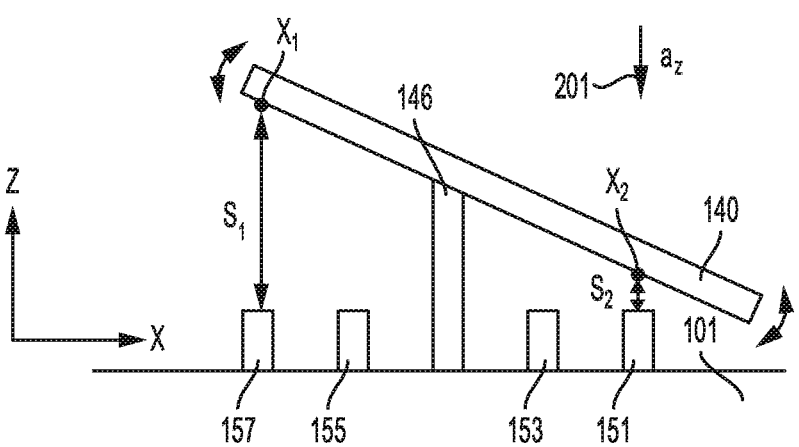
FIG. 2C is a side view of the MEMS accelerometer of FIG. 1A with an acceleration and a driving signal acting on the MEMS accelerometer, according to some non-limiting embodiments.

FIGS. 2A-C are a side view of the MEMS accelerometer 100 under various conditions. First, FIG. 2A illustrates a case in which no accelerations along the z-axis are present. If drive circuitry 150 drives the drive capacitors with a signal oscillating in time at a frequency f, the resonator structures may respond by vibrating out-of-plane with an oscillation period given by 1/f. As a result, the frequency detected by sense circuitry 152 may be equal to f. As illustrated, the average separation between a reference location $X_1$ of the second resonator structure 144 and sense electrode 157 is denoted by "$s_1$" and the average separation between a reference location $X_2$ of the first resonator structure 112 and sense electrode 151 is denoted by "$s_2$". When the proof masses 110 and 140 are still and parallel to the xy-plane such that the separation between the first resonator structure 112 and the sense electrode 151 is equal to $s_2$ and the separation between the second resonator structure 144 and the sense electrode 157 is equal to $s_1$, the proof masses 110 and 140 are said to be in "resting position". The oscillating signal provided by drive circuitry 150 causes resonator structures 112 and 144 to vibrate out-of-plane, such that the separations oscillate from the resting positions $s_1$ and $s_2$. Separations $s_1$ and $s_2$ may be less than 1 μm, less than 800 nm, less than 600 nm, less than 400 nm, less than 200 nm or less than 100 nm, as non-limiting example.

Second, FIG. 2B illustrates a case in which the MEMS resonant accelerometer 100 experiences an acceleration $a_z$ directed along the z-axis with no drive signals being applied to the drive capacitors. In this case, due to the proof masses 110 and 140 being anchored away from their centers of mass, the acceleration causes a net non-zero force to be applied to the center of the masses. As a result, the proof masses 110 and 140 rotate about their respective anchors 116 and 146 thus departing from their resting positions. For example, in cases in which $a_z$ is directed in the negative z-direction, as shown by vector 201, proof masses 110 and 140 rotate about the anchors such that the separation between the heavy mass portions (the second mass portion 113 and the fourth mass portion 143) and the substrate 101 is reduced. Because the first resonator structure 112 is on the second side of the proof mass 110, surrounded by the second mass portion 113) and the second resonator structure 144 is on the first side of the proof mass 140, surrounded by the third mass portion 141, the first resonator structure 112 and the second resonator structure 144 move in opposite directions in the z-direction relative to the substrate 101. In the illustrated case, the separation between reference location $X_1$ of second resonator structure 144 and sense electrode 157 is increased and denoted by "$s_1$'" and the separation between reference location $X_2$ of first resonator structure 112 and sense electrode 151 is decreased and denoted by "$s_2$'".

Finally, FIG. 2C illustrates a case in which the MEMS resonant accelerometer 100 experiences an acceleration $a_z$ directed along the z-axis and drive signals are applied to the drive capacitors. As in the case illustrated in FIG. 2A, the drive signals, which oscillate at frequency f, cause the resonator structures 112 and 144 to oscillate out-of-plane. However, due to the presence of the z-axis acceleration $a_z$, the average separations between reference locations $X_1$ and $X_2$ and the sense electrodes 157 and 151, respectively, are $s_1$' rather than $s_1$ and $s_2$' rather than $s_2$. As a result, the resonant frequencies of the resonator structures, which depend on the separation, shift in opposite directions. The extent to which the resonant frequencies shifts from frequency f may depend on the magnitude of acceleration $a_z$. Therefore, in some embodiments, sense circuitry 152 may infer the magnitude of the acceleration based on the shift in the resonant frequencies.

According to one aspect of the present application, differential signals may be generated in response to accelerations parallel to the z-axis. Compared to single-ended signals, differential signals may be more immune to common mode signals, such as undesired signals caused by deformations of the substrate due to stress. To generate differential signals, in some embodiments, sense electrode 151 may be positioned in proximity to the first resonator structure 112 (e.g., such that the first resonator structure 112 and sense electrode 151 spatially overlap, at least in part, in the xy-plane while being separated along the z-axis), and the sense electrode 157 may be positioned in proximity to the second resonator structure 144 (e.g., such that the second resonator structure 144 and the sense electrode 157 spatially overlap, at least in part, in the xy-plane while being separated along the z-axis). This configuration is illustrated in FIG. 1A and FIG. 1C. Because the first resonator structure 112 and the second resonator structure 144 are on opposite sides of the anchor axis defined by line 160, when the separation between sense electrode 151 and the first resonator structure 112 increases, the separation between sense electrode 157 and the second resonator structure 144 decreases (and vice versa). As a result, when the frequency of the signal sensed by sense electrode 151 increases, with respect to the frequency of the driving signal, the frequency of the signal sensed by sense electrode 157 decreases, and differential signals may be generated. In some embodiments, resonator masses 112 and 144 may be driven to vibrate out-of-phase with respect to each other (e.g., with a phase difference that is 180°, or between 170° and 190°).

In one example, assuming that the frequency of the driving signal is f, the frequency of the signal sensed by sense electrode 151 in the presence of a z-axis acceleration may be $f_1=f+\Delta f_1$ and the frequency of the signal sensed by sense electrode 157 may be $f_2=f-\Delta f_2$. Sense circuitry 152 may be configured to compute $f_1-f_2$, thus obtaining $\Delta f_1+\Delta f_2$. The magnitude of the acceleration may be inferred from $\Delta f_1+\Delta f_2$. Being a differential detection, common mode signals captured by both sense electrodes 151 and 157 (such as signals caused by deformations of the substrate due to stress) may be rejected (or at least limited). In some embodiments, the sense electrodes may be positioned such that, in the presence of z-axis accelerations, $\Delta f_1=\Delta f_2=\Delta f$. In these embodiments, $f_1-f_2=2\Delta f$.

In some embodiments, the sense electrodes are positioned such that one sense electrode is proximate the heavy mass portion of a proof mass and the other sense electrode is proximate the light mass portion of the other proof mass. For example, FIG. 1A and FIG. 1C illustrate a case in which sense electrode 151 is proximate the second mass portion 113 (which is heavier than the first mass portion 111) of the first proof mass 110, and sense electrode 157 is proximate the third mass portion 141 (which is the lighter than the fourth mass portion 143) of the second proof mass 140. This configuration may cause the separation between one resonator structure, embedded within a particular mass portion, and its corresponding sense electrode to increase and the separation between the other resonator structure, embedded within a different mass portion, and its corresponding sense electrode to increase. As a result, differential signals may be generated in response to accelerations, and undesired signals (e.g., signal offsets caused by stress in the substrate or sense signals arising from accelerations that are not parallel to the z-axis) may be rejected or at least limited.

Figure 3:
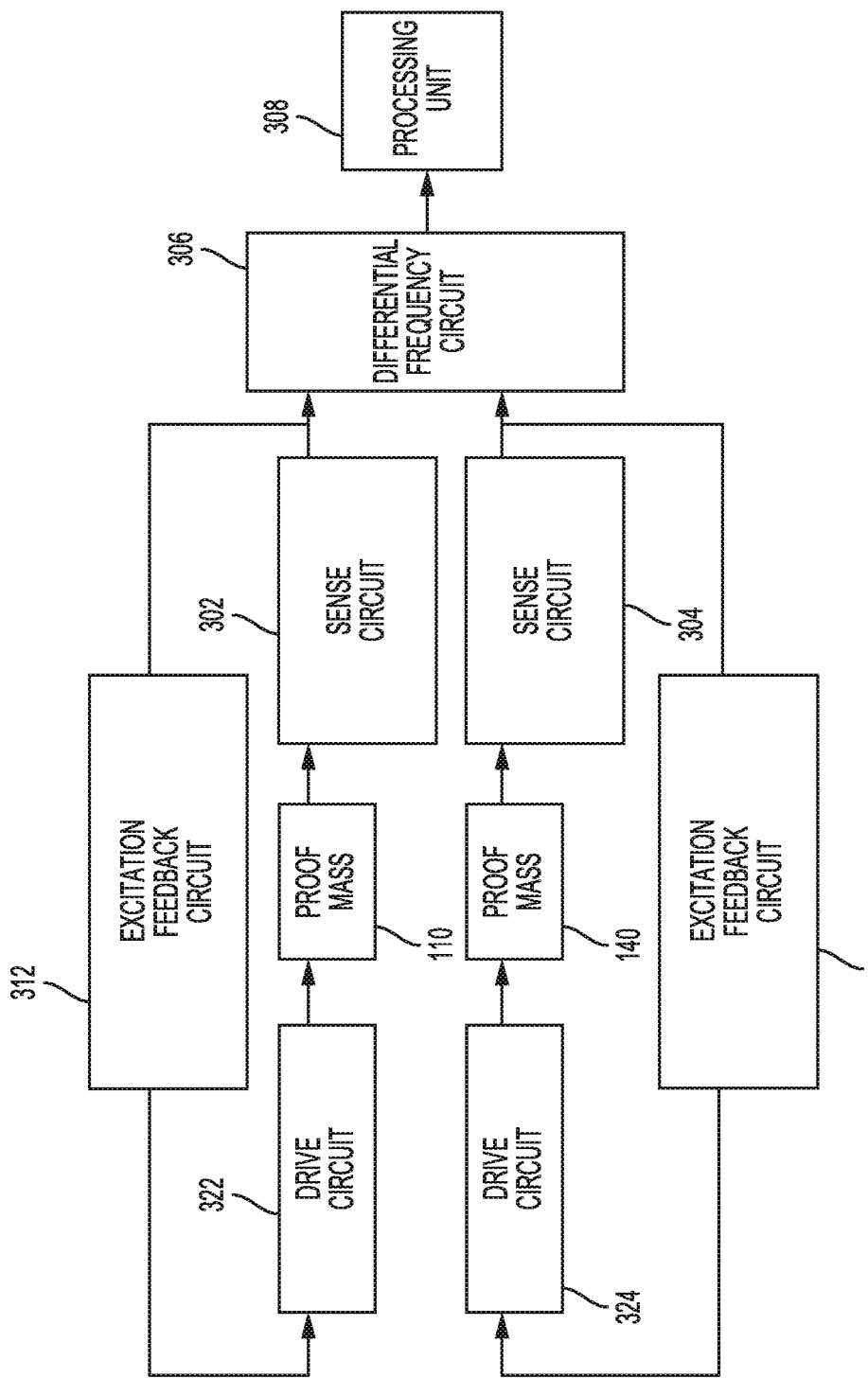
FIG. 3 is a block diagram illustrating circuitry for driving and sensing a MEMS accelerometer, according to some non-limiting embodiments.

As described above, drive circuitry 150 may be configured to provide drive signals to the drive capacitors and sense circuitry 152 may be configured to detect signals provided by the sense capacitors, and to detect variations in resonant frequency with respect to the frequency of the drive signals. A non-limiting implementation of drive circuitry 150 and sense circuitry 152 is shown in FIG. 3. System 300 may comprise proof masses 110 and 104 (arranged in any one of the configurations described above) sense circuits 302 and 304, excitation feedback circuits 312 and 314, drive circuits 322 and 324, differential frequency circuit 306 and processing unit 308.

Sense circuit 302 may be coupled to sense electrode 151 and sense circuit 304 may be coupled to sense electrode 157. Sense circuits 302 and 304 may collectively serve as sense circuitry 152. Drive circuit 322 may be coupled to drive electrode 153 and drive circuit 324 may be coupled to drive electrode 155. Drive circuits 322 and 324 may collectively serve as drive circuitry 150. Sense circuits 302 and 304 may be configured to receive signals generated in response to motion of the proof masses, and to obtain the frequencies at which the signals resonate. As described above, the frequencies at which these signals resonate may be different, depending on the magnitude of the acceleration experienced by the proof masses, from the resonant frequency of the drive signals. In some embodiments, sense circuits 302 and 304 may each comprise a phase-locked loop (PLL). The PLLs may be configured to lock to the frequencies at which the received signals resonate, and to output values representative of these frequencies.

Differential frequency circuit 306 may be configured to combine the frequencies obtained with sense circuits 306. This may be performed in the analog and/or the digital domain. As such, sense circuits 302 and 304 may comprise analog-to-digital converters in some embodiments. In some embodiments, differential frequency circuit 306 subtracts the frequency obtained with sense circuit 302 from the frequency obtained with sense circuit 304 (or vice versa), thus obtaining a differential representation of the acceleration experienced by the MEMS resonant accelerometer. The result of this operation may be, for example, $\Delta f_1-\Delta f_2$ or $2\Delta f$. Processing unit 308 may infer the magnitude of the acceleration based on such a differential representation. For example, processing unit 308 may include a memory loaded with a look-up-table (LUT) mapping acceleration magnitude to $\Delta f_1 - \Delta f_2$ (or $2\Delta f$). The LUT may be generated, for example, using a calibration procedure.

In some embodiments, the resonator structures may be driven based on the frequencies sensed by the sense circuits. As such, feedback loop circuits may be provided. In the example of FIG. 3, excitation feedback circuit 312 couples sense circuit 302 to drive circuit 322 and excitation feedback circuit 314 couples sense circuit 304 to drive circuit 324. The excitation feedback circuits may be configured to cause the drive circuits to select the driving frequencies based on the sensed frequencies. This may be done, for example, to ensure that the proof masses do not oscillate outside a motion range deemed safe. Drive circuits 322 and 324 may each comprise an oscillator configured to output a periodic signal (e.g., a sinusoidal signal). In some embodiments, the signals provided by drive circuits 322 and 324 may be out-of-phase with respect to one another (e.g., with a phase difference of 180° or between 170° and 190°).

Figure 4:
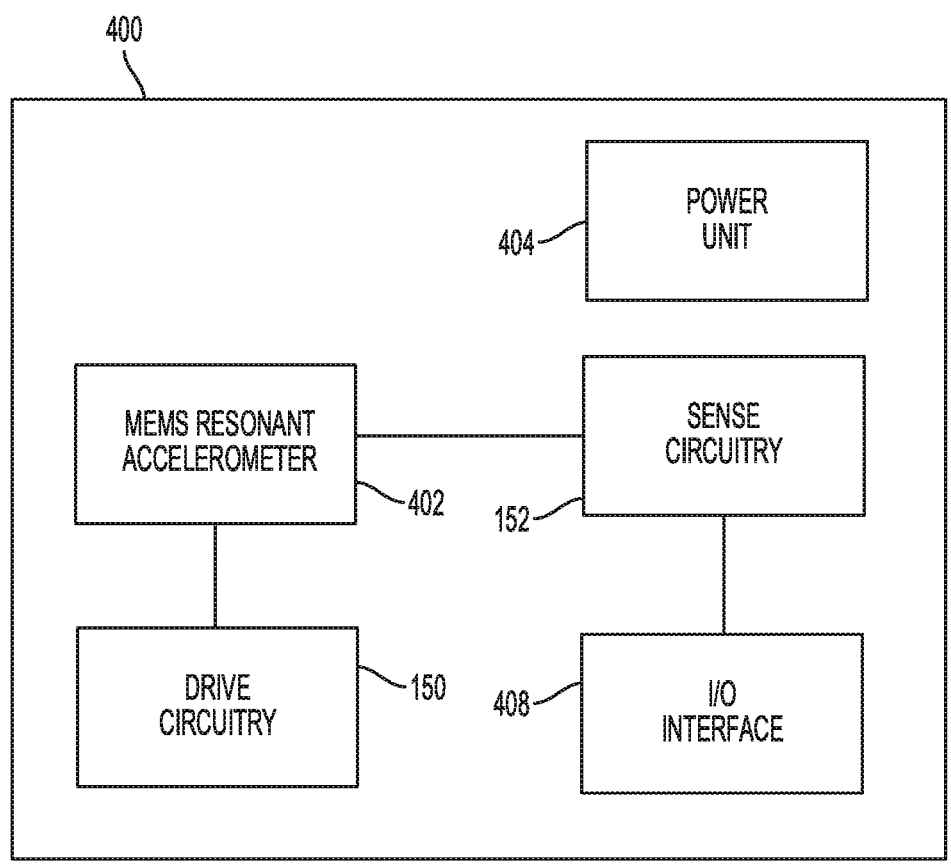
FIG. 4 is a block diagram illustrating a MEMS device comprising a MEMS accelerometer, according to some non-limiting embodiments.

MEMS resonant accelerometers of the type described herein may be used in connection with other electrical components to form MEMS devices. An example of such a MEMS device 400 is depicted in FIG. 4. The MEMS device 400 may be deployed in various settings to detect acceleration, including sports, healthcare, military, and industrial applications, among others. For example, the MEMS device 400 may be a wearable sensor deployed in monitoring sports-related physical activity and performance, patient health, military personnel activity, or other applications of interest of a user. In another example, the MEMS device 400 may be used in seismic applications, such as to sense and/or predict earthquakes.

The MEMS device 400 may comprise MEMS resonant accelerometer 402, drive circuitry 150, sense circuitry 152, I/O interface 408, and power unit 404. MEMS resonant accelerometer 402 may be implemented using any one of the embodiments described above. Drive circuitry 150 and sense circuitry 152 have been described above.

The MEMS device 400 may periodically transmit, via wired connections or wirelessly, signals representative of sensed accelerations to an external monitoring system, such as a computer, a smartphone, a tablet, a smartwatch, smart-glasses, or any other suitable receiving device. I/O interface 408 may be configured to transmit and/or receive data via Wi-Fi, Bluetooth, Bluetooth Low Energy (BLE), Zigbee, Thread, ANT, ANT+, IEEE 802.15.4, IEEE 802.11.ah, or any other suitable wireless communication protocol. Alternatively, or additionally, I/O interface 408 may be configured to transmit and/or receive data using proprietary connectivity protocols. I/O interface 408 may comprise one or more antennas, such as a microstrip antenna. In some embodiments, I/O interface 408 may be connected to a cable, and may be configured to transmit and/or receive signals through the cable.

The MEMS device 400 may be powered using power unit 404. Power unit may be configured to power drive circuitry 150, sense circuitry 152, and I/O interface 408, or just a subset of these. In some embodiments, power unit 404 may comprise one or more batteries. The MEMS device 400 may, in at least some embodiments, consume sufficiently little power to allow for its operation for extended periods based solely on battery power. The battery or batteries may be rechargeable in some embodiments. Power unit 404 may comprise one or more lithium-ion batteries, lithium polymer (LiPo) batteries, super-capacitor-based batteries, alkaline batteries, aluminum-ion batteries, mercury batteries, dry-cell batteries, zinc-carbon batteries, nickel-cadmium batteries, graphene batteries or any other suitable type of battery. In some embodiments, power unit 404 may comprise circuitry to convert AC power to DC power. For example, power unit 404 may receive AC power from a power source external to the MEMS device 400, such as via I/O interface 408, and may provide DC power to some or all the components of the MEMS device 400. In such instances, power unit 404 may comprise a rectifier, a voltage regulator, a DC-DC converter, or any other suitable apparatus for power conversion.

Power unit 404 may comprise energy harvesting components and/or energy storage components, in some embodiments. Energy may be harvested from the surrounding environment and stored for powering the MEMS device 400 when needed, which may include periodic, random, or continuous powering. The type of energy harvesting components implemented may be selected based on the anticipated environment of the MEMS device 400, for example based on the expected magnitude and frequency of motion the MEMS device 400 is likely to experience, the amount of stress the system is likely to experience, the amount of light exposure the system is likely to experience, and/or the temperature(s) to which the system is likely to be exposed, among other possible considerations. Examples of suitable energy harvesting technologies include thermoelectric energy harvesting, magnetic vibrational harvesting, electrical overstress harvesting, photovoltaic harvesting, radio frequency harvesting, and kinetic energy harvesting. The energy storage components may comprise supercapacitors in some embodiments.

In some embodiments, the MEMS device 400 may comprise one or more other MEMS components, such as gyroscopes, resonators, and/or other types of accelerometers. The MEMS components may be used collectively to analyze the overall behavior of a person or an object, on which the MEMS device 400 is disposed.

One representative application of the MEMS device 400 is in health monitoring devices. In such application, the MEMS device 400 may be configured to be attached, tied or clipped to the body of a user. For example, the MEMS device 400 may be attached to a user's head, chest, arm or leg. In some embodiments, the MEMS device 400 may be configured to detect accelerations caused by the user's cardiovascular activity and/or pulmonary activity. Additionally, or alternatively, the MEMS device 400 may be configured to monitor a user's physical activity, for example by counting the number of steps, by measuring stride length, and/or by measuring a limb's motion range.

Figure 5:
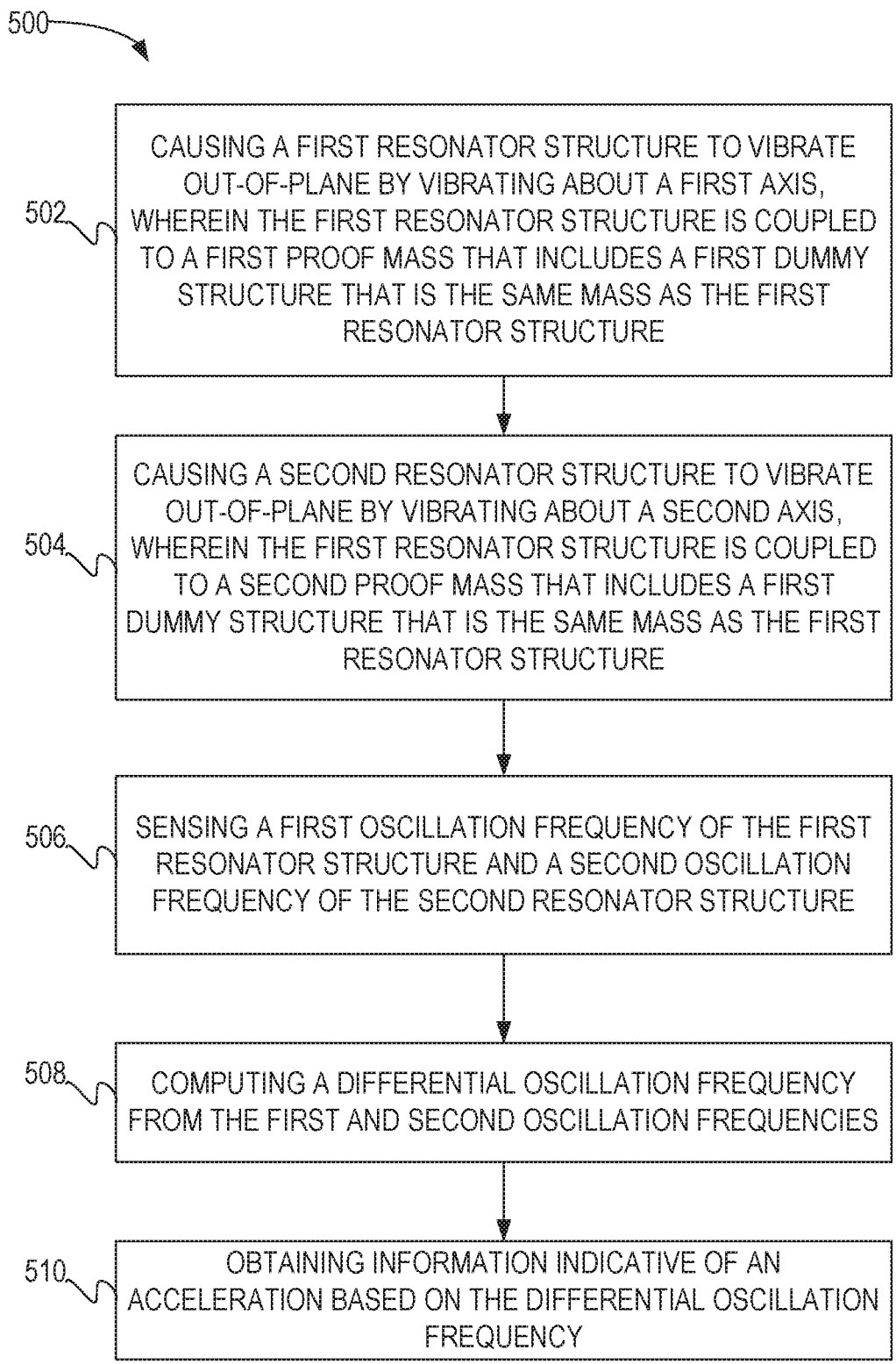
FIG. 5 is a flowchart of a method for sensing accelerations using a MEMS accelerometer, according to some non-limiting embodiments.

FIG. 5 is a flowchart of a method 500 of for sensing accelerations using a MEMS accelerometer, according to some non-limiting embodiments. At act 502, the method 500 includes causing a first resonator structure to vibrate out-of-plane by vibrating about a first axis, wherein the first resonator structure is coupled to a first proof mass that includes a first dummy structure that is the same mass as the first resonator structure. For example, this may be achieved by driving the first resonator structure 112 via drive electrode 153 using drive circuitry 152, as described above.

At act 504, the method 500 includes causing a second resonator structure to vibrate out-of-plane by vibrating about a second axis, wherein the second resonator structure is coupled to a second proof mass that includes a second dummy structure that is the same mass as the second resonator structure. For example, this may be achieved by driving the second resonator structure 144 via drive electrode 153 using drive circuitry 152, as described above. In some embodiments, causing the first resonator structure to resonate may be performed via electrostatic attraction and repulsion.

At act 504, the method 500 includes causing a second resonator structure to vibrate out-of-plane by vibrating about a second axis, wherein the second resonator structure is coupled to a second proof mass that includes a second dummy structure that is the same mass as the second resonator structure. For example, this may be achieved by driving the second resonator structure 144 via drive electrode 155 using drive circuitry 152, as described above. In some embodiments, causing the second resonator structure to resonate may be performed via electrostatic attraction and repulsion.

At act 506, the method 500 includes sensing a first oscillation frequency of the first resonator structure and a second oscillation frequency of the second resonator. For example, this may be achieved by capacitive sensing the separation between the first resonant structure 112 and the sensing electrode 151 using sense circuitry 152 and capacitive sensing the separation between the second resonant structure 144 and the sensing electrode 157 using sense circuitry 152, as described above.

At act 508, the method 500 includes computing a differential oscillation frequency from the first and second oscillation frequencies. In some embodiments, computing the differential oscillation frequency includes computing a difference between the first and second oscillation frequencies.

At act 510, the method 500 includes obtaining information indicative of an acceleration based on the differential oscillation frequency. For example, this may be achieved using processing unit 308 to look-up an acceleration magnitude in a table mapping acceleration magnitude to the differential frequency, as described above.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, and/or methods described herein, if such features, systems, articles, materials, and/or methods are not mutually inconsistent, is included within the scope of the present disclosure.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. Use of such ordinal terms in the claims does not necessarily have the same meaning or refer to the same component as components the specification that use the same ordinal terms.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately," "substantially," and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

The invention claimed is:

1. A microelectromechanical system (MEMS) accelerometer comprising:
   a first teeter-totter structure, comprising:
      a first proof mass coupled to a substrate through a first anchor, the first proof mass having first and second mass portions having different masses and disposed at opposite sides of the first proof mass with respect to the first anchor;
      a first resonator structure pivotally attached to the first proof mass and configured to vibrate relative to the first proof mass; and
      a first dummy structure fixedly attached to the first proof mass; and
   a second teeter-totter structure, comprising:
      a second proof mass coupled to the substrate through a second anchor, the second proof mass having third and fourth mass portions having different masses and disposed at opposite sides of the second proof mass with respect to the second anchor;
      a second resonator structure pivotally attached to the second proof mass and configured to vibrate relative to the second proof mass; and
      a second dummy structure fixedly attached to the second proof mass.

2. The MEMS accelerometer of claim 1, further comprising:
   a first sense electrode and a first drive electrode disposed on the substrate and in proximity to the first resonator structure of the first teeter-totter structure; and
   a second sense electrode and a second drive electrode disposed on the substrate and in proximity to the second resonator structure of the second teeter-totter structure.

3. The MEMS accelerometer of claim 2, wherein a first signal from the first sense electrode and a second signal from the second sense electrode are configured to be processed in combination to determine an acceleration.

4. The MEMS accelerometer of claim 1, wherein:
the first resonator structure is at least partially surrounded by the first mass portion of the first proof mass;
the first dummy structure is at least partially surrounded by the second mass portion of the first proof mass, wherein the first mass portion has a greater mass than the second mass portion.

5. The MEMS accelerometer of claim 1, wherein:
the first proof mass is elongated in a first direction;
the second proof mass is elongated in the first direction; and
the first anchor and the second anchor are substantially aligned along a second direction perpendicular to the first direction, forming an anchor axis.

6. The MEMS accelerometer of claim 5, wherein:
the first resonator structure is configured to vibrate about a first axis oriented along the second direction; and
the second resonator structure is configured to vibrate about a second axis oriented along the second direction.

7. The MEMS accelerometer of claim 6, wherein the first axis is on a first side of the anchor axis and the second axis is on a second side of the anchor axis.

8. The MEMS accelerometer of claim 1, wherein:
the first proof mass is coupled to the first anchor through a first plurality of tethers; and
the first resonator structure is coupled to the first proof mass through a second plurality of tethers.

9. A microelectromechanical system (MEMS) device comprising:
an accelerometer comprising:
a first teeter-totter structure, comprising:
a first proof mass coupled to a substrate through a first anchor, the first proof mass having first and second mass portions having different masses and disposed at opposite sides of the first proof mass with respect to the first anchor;
a first resonator structure pivotally attached to the first proof mass and configured to resonate relative to the first proof mass; and
a first dummy structure fixedly attached to the first proof mass; and
a second teeter-totter structure, comprising:
a second proof mass coupled to the substrate through a second anchor, the second proof mass having third and fourth mass portions having different masses and disposed at opposite sides of the second proof mass with respect to the second anchor;
a second resonator structure pivotally attached to the second proof mass and configured to vibrate relative to the second proof mass; and
a second dummy structure fixedly attached to the second proof mass.

10. The MEMS device of claim 9, further comprising:
a first sense electrode and a first drive electrode disposed on the substrate and in proximity to the first resonator structure of the first teeter-totter structure; and
a second sense electrode and a second drive electrode disposed on the substrate and in proximity to the second resonator structure of the second teeter-totter structure.

11. The MEMS accelerometer of claim 10, wherein a first signal from the first sense electrode and a second signal from the second sense electrode are configured to be processed in combination to determine an acceleration.

12. The MEMS device of claim 9, wherein:
the first resonator structure is at least partially surrounded by the first mass portion of the first proof mass;
the first dummy structure is at least partially surrounded by the second mass portion of the first proof mass, wherein the first mass portion has a greater mass than the second mass portion.

13. The MEMS device of claim 9, wherein:
the first proof mass is elongated in a first direction;
the second proof mass is elongated in the first direction; and
the first anchor and the second anchor are substantially aligned along a second direction perpendicular to the first direction, forming an anchor axis.

14. The MEMS device of claim 13, wherein:
the first resonator structure is configured to vibrate about a first axis oriented along the second direction; and
the second resonator structure is configured to vibrate about a second axis oriented along the second direction.

15. The MEMS device of claim 14, wherein the first axis is on a first side of the anchor axis and the second axis is on a second side of the anchor axis.

16. The MEMS device of claim 9, wherein:
the first proof mass is coupled to the first anchor through a first plurality of tethers; and
the first resonator structure is coupled to the first proof mass through a second plurality of tethers.

17. A method for sensing accelerations using a microelectromechanical system (MEMS) accelerometer, the method comprising:
causing a first resonator structure to vibrate out-of-plane by vibrating about a first axis, wherein the first resonator structure is coupled to a first proof mass that includes a first dummy structure that is the same mass as the first resonator structure;
causing a second resonator structure to vibrate out-of-plane by vibrating about a second axis, wherein the second resonator structure is coupled to a second proof mass that includes a second dummy structure that is the same mass as the second resonator structure;
sensing a first oscillation frequency of the first resonator structure and a second oscillation frequency of the second resonator structure; and
computing a differential oscillation frequency from the first and second oscillation frequencies.

18. The method of claim 17, wherein computing the differential oscillation frequency comprises computing a difference between the first and second oscillation frequencies.

19. The method of claim 17, further comprising obtaining information indicative of an acceleration based on the differential oscillation frequency.

20. The method of claim 17, wherein causing the first resonator structure to resonate is performed via electrostatic attraction and repulsion.

* * * * *